US011181176B2

(12) United States Patent
Angel et al.

(10) Patent No.: US 11,181,176 B2
(45) Date of Patent: Nov. 23, 2021

(54) THRUST WASHER ASSEMBLY FOR A TORQUE CONVERTER

(71) Applicant: Schaeffler Technologies AG & Co. KG, Herzogenaurach (DE)

(72) Inventors: Scott Angel, Wooster, OH (US); Christopher Krause, Polk, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 81 days.

(21) Appl. No.: 16/794,301

(22) Filed: Feb. 19, 2020

(65) Prior Publication Data

US 2020/0263774 A1    Aug. 20, 2020

Related U.S. Application Data

(60) Provisional application No. 62/807,951, filed on Feb. 20, 2019.

(51) Int. Cl.
*F16H 45/02* (2006.01)
*F16H 41/24* (2006.01)
*F16C 17/04* (2006.01)

(52) U.S. Cl.
CPC .......... *F16H 45/02* (2013.01); *F16C 17/04* (2013.01); *F16C 2226/54* (2013.01); *F16H 2045/0221* (2013.01)

(58) Field of Classification Search
CPC ............... F16H 45/02; F16H 45/021; F16H 2045/0205; F16H 2045/0284; F16H 2045/0278; F16H 2045/0294; F16H 2045/0221; F16H 2045/0252; F16H 2045/0226; F16H 2045/002; F16H 2045/005; F16H 41/28; F16H 41/24; F16C 17/04; F16C 17/02; F16C 17/10; F16C 2226/54

See application file for complete search history.

(56) References Cited

U.S. PATENT DOCUMENTS

| | | | | |
|---|---|---|---|---|
| 4,867,290 A * | 9/1989 | Macdonald | ........... | F16F 15/129 192/3.28 |
| 5,007,746 A * | 4/1991 | Matzelle | ................ | F16C 17/04 384/420 |
| 9,816,596 B1 * | 11/2017 | Nelson | .................... | F16H 41/28 |
| 10,309,270 B2 * | 6/2019 | Boese | .................. | F01L 1/3442 |
| 2008/0190102 A1 * | 8/2008 | Kawamura | ............. | F16H 41/24 60/365 |
| 2015/0113972 A1 * | 4/2015 | Ideshio | ................... | F16H 41/24 60/458 |
| 2015/0167809 A1 * | 6/2015 | Simon | ..................... | F16H 45/02 60/331 |
| 2015/0192194 A1 * | 7/2015 | Mencher | ............... | F16F 15/145 192/3.28 |
| 2017/0211673 A1 * | 7/2017 | Norwich | ................. | F16H 45/02 |
| 2017/0292592 A1 * | 10/2017 | Hague | .................. | F16C 17/045 |
| 2018/0031098 A1 * | 2/2018 | Adari | ..................... | F16H 45/02 |

(Continued)

*Primary Examiner* — Charles A Fox
*Assistant Examiner* — Ryan P Dodd
(74) *Attorney, Agent, or Firm* — LeKeisha M. Suggs

(57) ABSTRACT

A turbine assembly includes a turbine shell, turbine hub, and a thrust washer. The turbine hub is coupled to the turbine shell via a fastener. The thrust washer is disposed on the turbine hub and includes at least one tab configured to contact the fastener. The fastener axially and radially retains the thrust washer on the turbine hub.

8 Claims, 10 Drawing Sheets

(56) References Cited

U.S. PATENT DOCUMENTS

2018/0073554 A1 3/2018 Lewis et al.
2018/0112756 A1* 4/2018 Adari .................... F16C 17/04
2019/0383375 A1 12/2019 Krause et al.

* cited by examiner

THRUST WASHER ASSEMBLY FOR A TORQUE CONVERTER

CROSS-REFERENCE TO RELATED APPLICATIONS

This application claims the benefit of U.S. Provisional Patent Application No. 62/807,951, filed Feb. 20, 2019, the disclosure of which is incorporated in its entirety by reference herein.

TECHNICAL FIELD

The present disclosure relates to a thrust washer for a turbine assembly in a torque converter.

BACKGROUND

Typically, thrust washers require axial retention and anti-rotation features such as retaining clips and anti-rotation pegs to keep the thrust washer in place axially and radially within a torque converter. These features require additional material to be used and increases overall costs and complexity of thrust washers.

SUMMARY

According to one embodiment, a turbine assembly includes a turbine shell, turbine hub, and a thrust washer. The turbine hub is coupled to the turbine shell via a fastener. The thrust washer is disposed on the turbine hub and includes at least one tab configured to contact the fastener. The fastener axially and radially retains the thrust washer on the turbine hub. In one embodiment, the turbine hub includes at least one recessed portion extending radially outward from an inner circumference of the turbine hub toward an outer circumference of the turbine hub. The at least one tab of the thrust washer is configured to nest within the at least one recessed portion of the turbine hub.

In one embodiment, the at least one tab includes a distal end with a groove formed therein and the groove is configured to accommodate a portion of the fastener. In some embodiments, the thrust washer includes a first radial surface and a second radial surface. The at least one tab extends radially outward from the first radial surface beyond an outer circumference of the thrust washer and at least one recessed portion is formed in the second radial surface. A plurality of grooves may be formed in the second radial surface for fluid flow therethrough. The at least one tab may have a first thickness that is less than a second thickness of the thrust washer defined between the first and second radial surfaces.

In some embodiments, the at least one tab extends from an outer circumferential surface of the thrust washer and includes an opening defined therein. The turbine hub includes at least one protrusion with an opening defined therethrough and the at least one protrusion is disposed within the opening of the thrust washer. A portion of the rivet may be disposed within the opening in the protrusion of the turbine hub and a rivet head of the rivet may be supported against the turbine hub and thrust washer.

DETAILED DESCRIPTION

Figure 1:
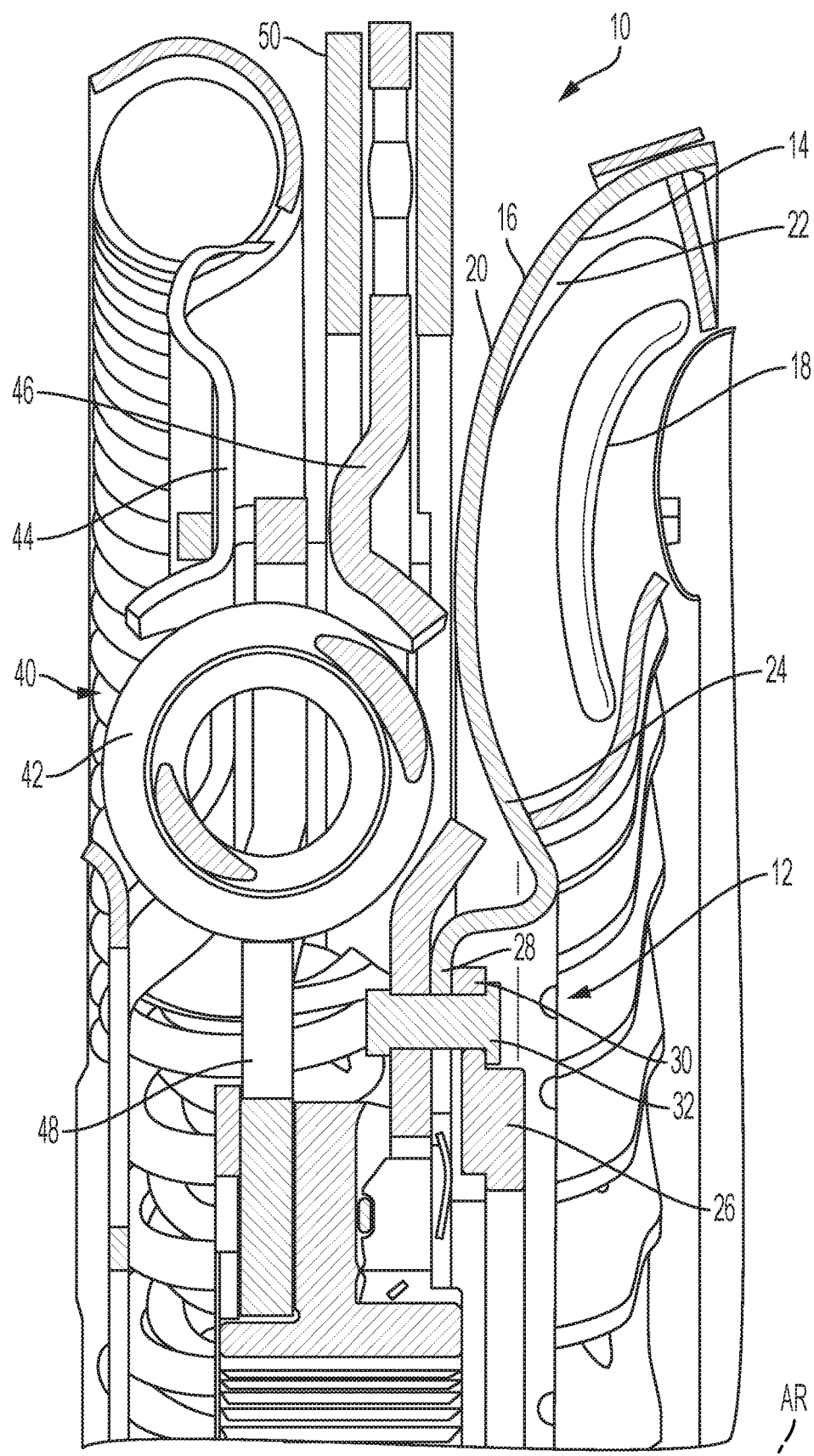
FIG. 1 shows a partial cross-sectional view of a torque converter according to an embodiment of the present disclosure.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Typically, thrust washers require retaining clips and anti-rotation pegs to keep the thrust washer in place axially and radially. These features require additional material to be included in the piece price of each individual thrust washer. Torlon, the material typically used to produce these thrust washers, is an expensive material and any reduction in material used would lead to a significant price reduction per part. Additionally, directly riveting the thrust washer without any form of steel backing could cause the thrust washer to crack and/or fail.

Embodiments of this disclosure provide a thrust washer that can be formed into a specific geometry that would allow it to be retained underneath a preformed fastener, such as a rivet head. By utilizing this geometry, less material would be used decreasing the piece price per washer and the absence of anti-rotation clips and anti-rotation pegs would decrease the complexity of molding the part. This design combines two features into one single feature. Additionally, the thrust washer and the stamped steel turbine hub would be formed in a way that would allow riveting without cracking and/or structurally compromising both parts.

Figure 2:
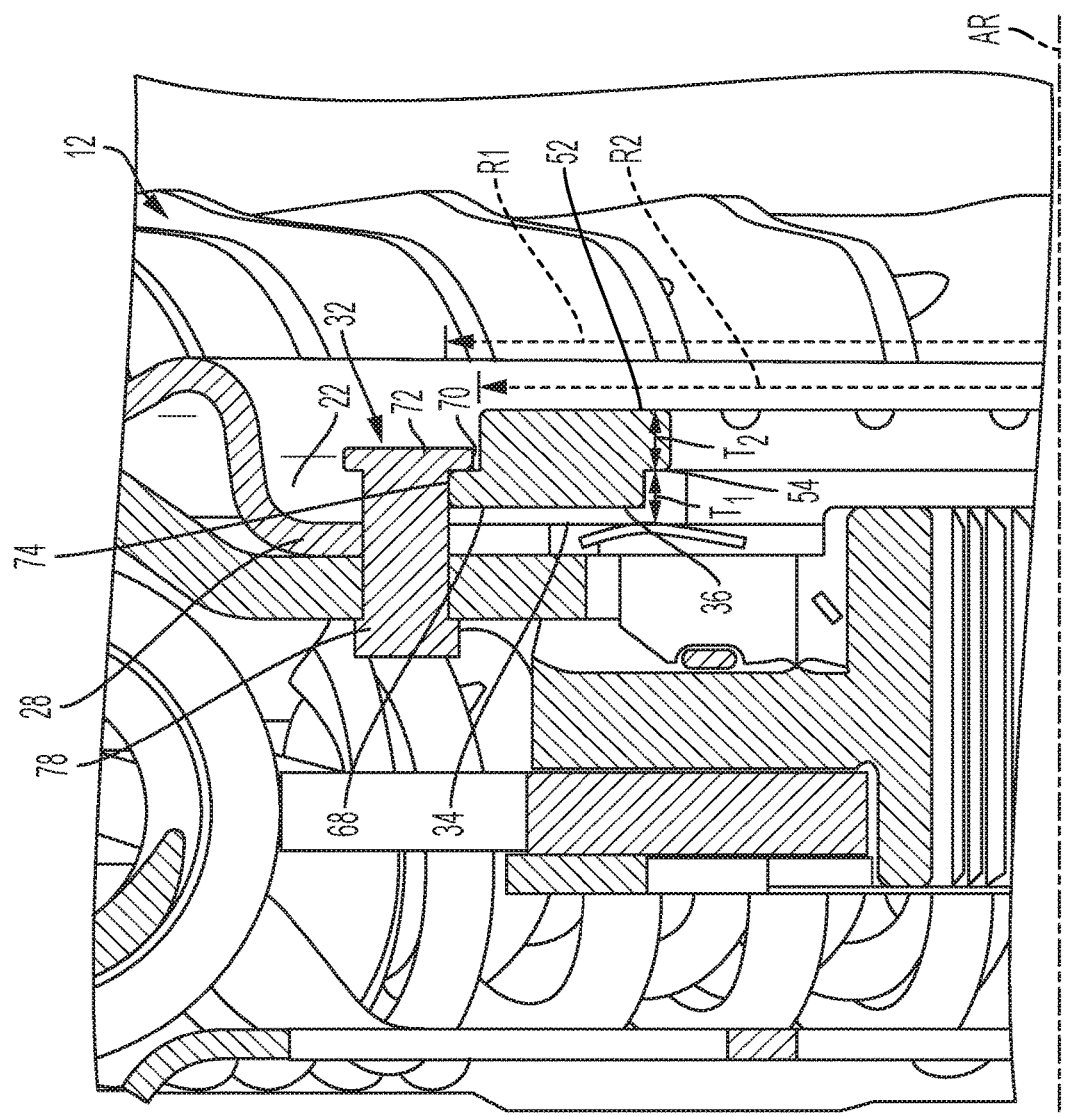
FIG. 2 shows an enlarged view of the turbine assembly shown in the torque converter of FIG. 1.

FIGS. 1 and 2 show a torque converter 10 including a turbine assembly 12 in accordance with an embodiment of the present disclosure. Torque converter 10 includes a front cover (not shown) for connecting with a crankshaft of a motor vehicle engine. Turbine assembly 12 includes turbine 14 opposite an impeller (not shown), wherein turbine 14 includes turbine shell 16 having outer surface 20 facing the front cover of torque converter 10 and an inner surface 22 facing a rear cover (not shown) of torque converter 10. Blades 18 are attached to inner surface 22 at rounded portion 24 of turbine 14. Turbine assembly 12 includes thrust washer 26 connected to radially inner portion 28 of turbine shell 16 between turbine 14 and the rear cover of torque converter 10. Radially inner portion 28 of turbine shell 16 extends radially inwardly from rounded portion 24 of turbine shell 16 toward axis of rotation AR. Radially inner portion 28 of turbine shell 16 is non-rotatably connected to turbine hub 30, which is connectable to a downstream drive component, for example a transmission, via an inner splined surface. That is, radially inner portion 28 is connected to turbine hub 30 on inner surface 22 of turbine shell 16. Turbine hub 30 includes a first radial surface 34 facing turbine 14 and a second radial surface 36, opposite the first radial surface 34, facing away from turbine 14. First radial surface 34 of turbine hub 30 is configured to contact inner surface 22 of turbine shell radially inner portion 28 when assembled together. In this embodiment, radially inner portion 28 is connected to turbine hub 30 and thrust washer 26 by one or more fastener, such as rivets 32.

A damper 40 is provided between turbine 14 and the front cover of torque converter 10. Damper 40 includes damping elements in the form of a plurality of circumferentially spaced springs 42, first and second cover plates 44, 46, output 48, and centrifugal pendulum absorber 50. Second cover plate 46 of damper 40 may be connected to radially inner portion 28 of turbine shell 16 on outer surface 20 via rivets 32.

Figure 3B:
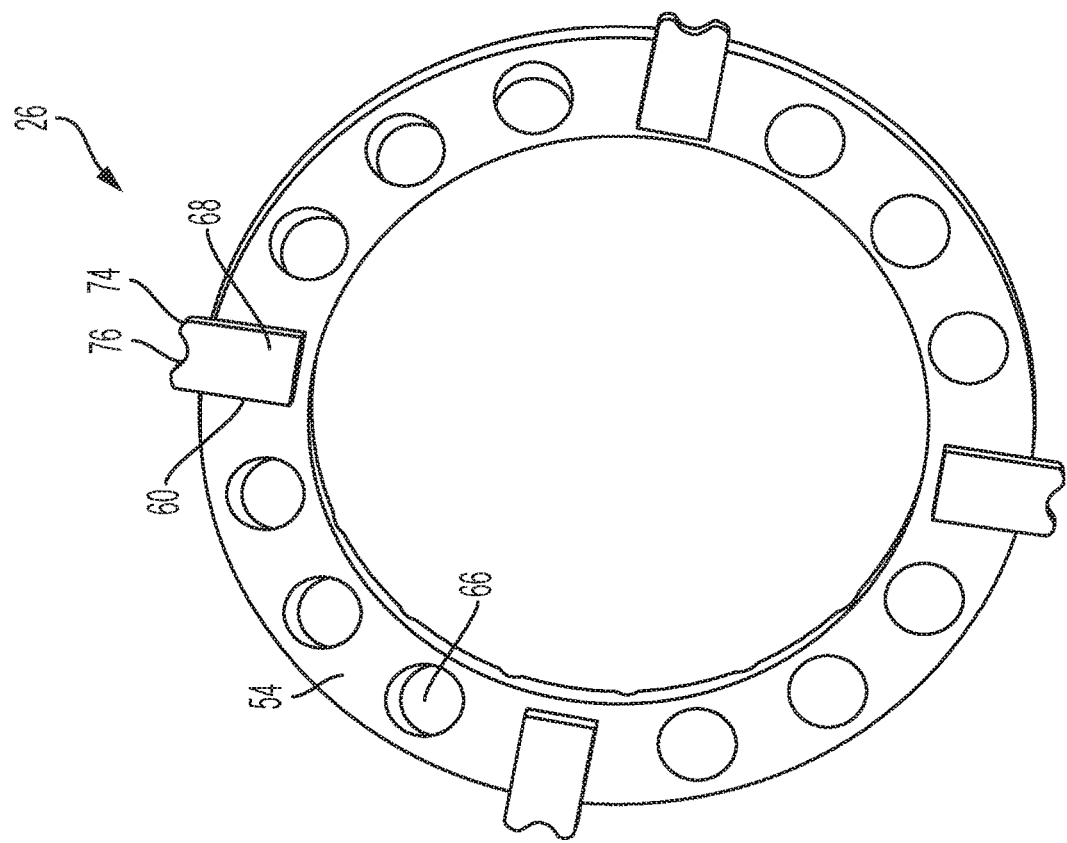
FIGS. 3A and 3B show front and back views, respectively, of the thrust washer shown in FIG. 1.
Figure 3A:
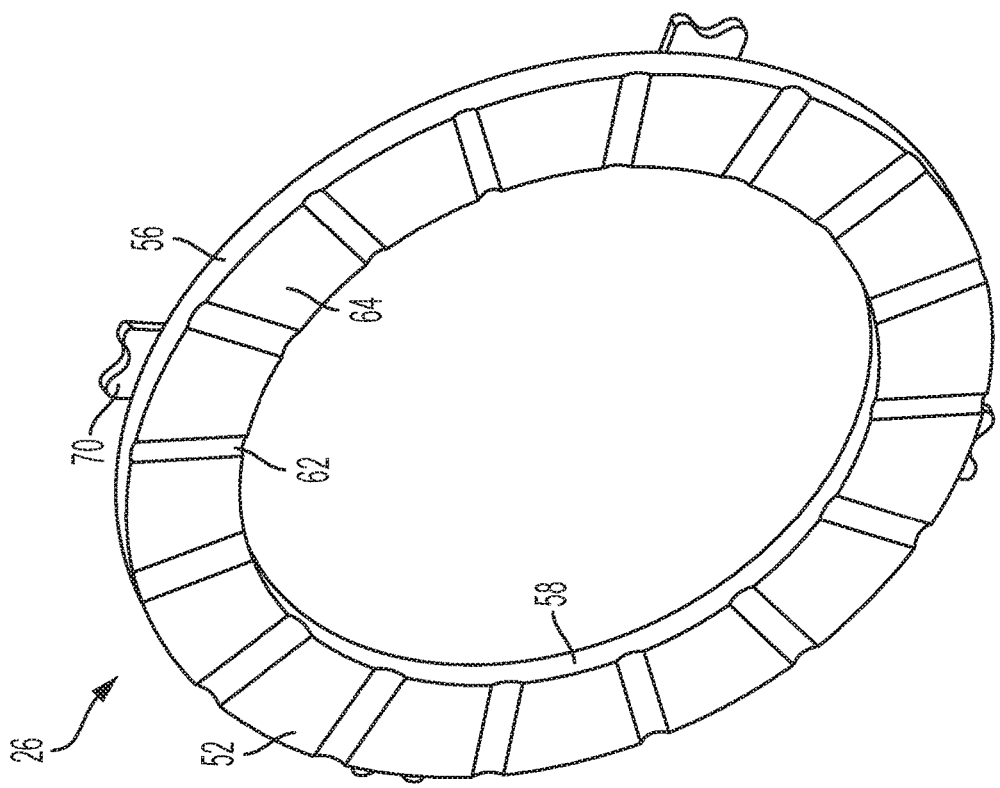
Figure 4:
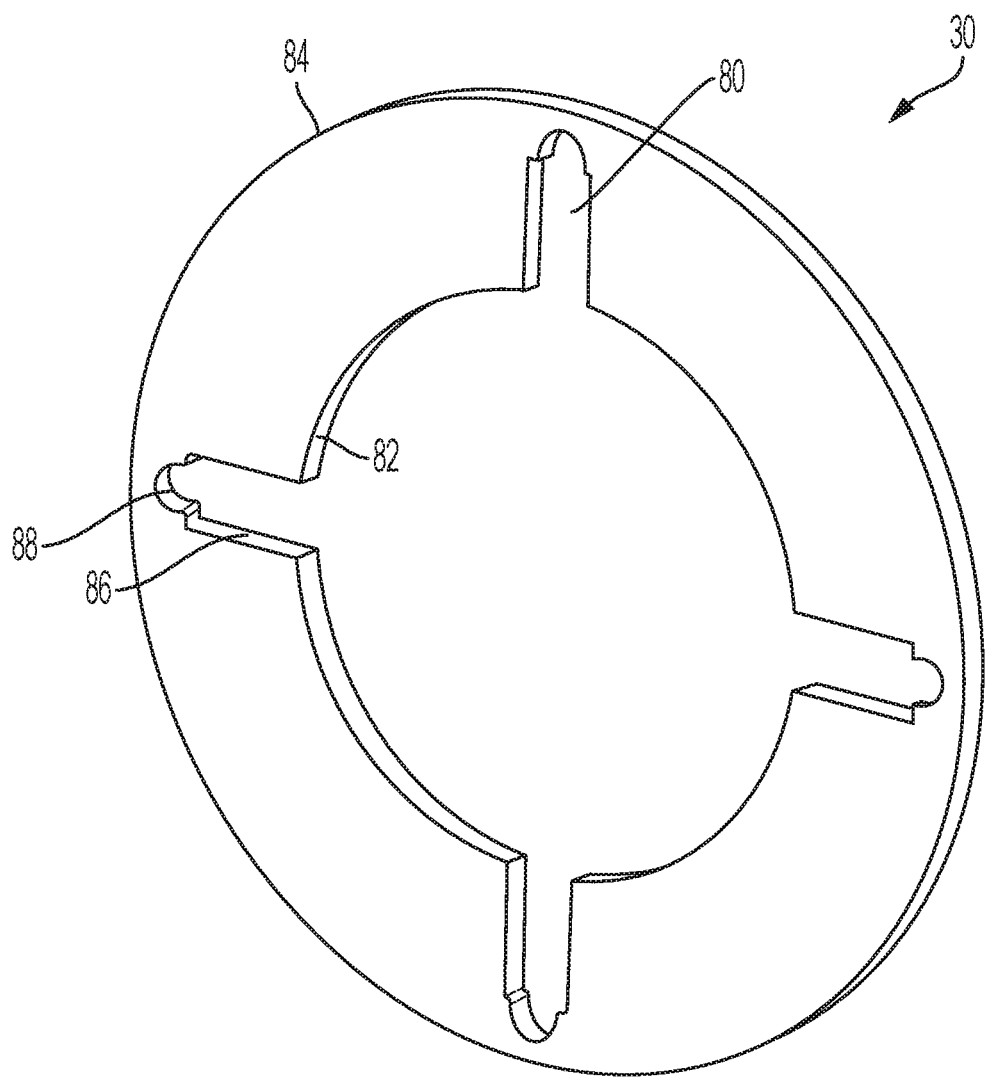
FIG. 4 shows a perspective view of the turbine hub shown in FIG. 1.

In one embodiment shown in FIGS. 3A-3B, thrust washer 26 includes a first radial surface 52 and a second radial surface 54 disposed opposite first radial surface 52. Thrust washer 26 further includes inner circumferential surface 58 and outer circumferential surface 56.

As shown in FIG. 3A, thrust washer 26 includes one or more grooves 62 formed in first radial surface 52 extending radially from inner circumferential surface 58 to outer circumferential surface 56 for fluid flow therebetween. A plurality of thrust pads or thrust surfaces 64 are disposed circumferentially between grooves 62. As shown in FIG. 3B, second radial surface 54 may include one or more empty pockets, or recessed portions, 66 formed therein and one or more tabs 60 extending axially and radially therefrom. The one or more empty pockets 66 may reduce overall mass and material cost and may be spaced circumferentially between the one or more tabs 60. For example, in one embodiment, second radial surface 54 may include four tabs 60 and three empty pockets 66 disposed circumferentially between pairs of tabs 60. That is, thrust washer 26 may include twelve empty pockets 66 formed in second radial surface 54. However, it is to be understood that fewer or more empty pockets 66 and/or tabs 60 may be provided.

Each of the tabs 60 extends axially outwardly from second radial surface 54 such that each tab 60 has a thickness T1 and extends radially outwardly beyond or past outer circumferential surface 56. Each tab 60 further includes first radial surface 68 facing turbine 14 and second radial surface 70, opposite first radial surface 68, facing away from turbine 14.

Thickness T1 of each tab 60 may be defined as the axial width between thrust washer second radial surface 54 and tab first radial surface 68 (see FIG. 2, for example). In one embodiment, thickness T1 of each tab 60 is less than thickness T2 of thrust washer 26 defined between first radial surface 52 and second radial surface 54. Each of the tabs includes a distal end 74 that extends radially beyond thrust washer outer circumferential surface 56. That is, a first radial distance R1 from axis of rotation AR to distal end 74 of each tab 60 is larger than, or exceeds, a second radial distance R2 of outer circumferential surface 56 measured from the axis of rotation AR. Distal end 74 further includes groove 76 formed therein and extending in a radially inward direction toward the axis of rotation AR. Groove 76 may be of circular shape that corresponds to, or complements, shape of rivet body portion 78 of rivet 32, which may be cylindrical. That is, groove 76 is shaped and/or formed such that when thrust washer 26 is installed on turbine hub 30 rivet body portion 78 is seated within groove 76. Moreover, tabs 60 are configured to prevent radial rotation of thrust washer 26 relative to turbine hub 30, and groove 76 of tab 60 is configured to center thrust washer 26 on rivet 32 and prevent axial and radial movement of thrust washer 26. In this way, tabs 60 of thrust washer 26 function as axial and radial retention elements, while also acting as anti-rotation elements. This design allows for these features (axial/radial retention and anti-rotation features) that are typically designed as separate features, such as retention clips and anti-rotation pins, to be combined into a single design, thereby reducing complexity and cost. Further, by combining these features into one, single simpler design and removing the anti-rotation pins for example, more empty pockets 66 can be included in second radial surface 54, thereby further reducing material used for thrust washer 26.

When thrust washer 26 is installed in turbine assembly 12, tab 60 is arranged such that a portion of rivet head 72 covers second radial surface 70 of tab 60 and thrust washer 26 is axially retained on turbine hub 30 (see FIG. 2, for example). The other portion of rivet head 72 directly contacts turbine hub 30 and is supported thereon. In this way, rivet head 72 is partially backed by the surface of the turbine hub 30, which may be formed of steel, such that riveting can be performed without cracking and/or structurally compromising the turbine hub 30 or thrust washer 26.

Figure 5B:
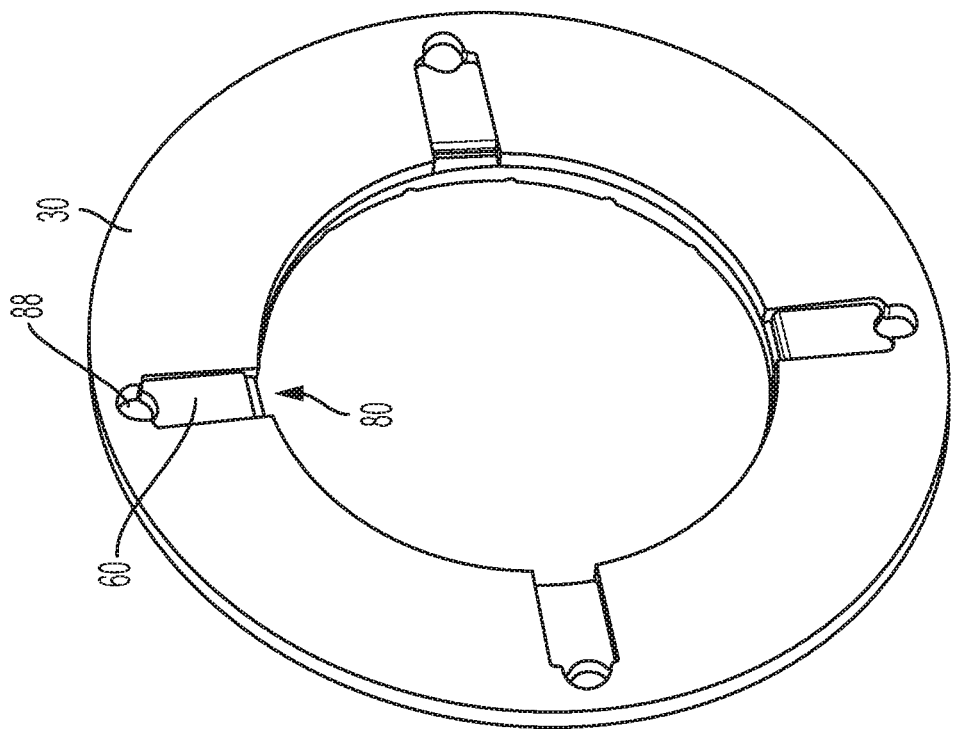
FIGS. 5A and 5B show front and back views, respectively, of the thrust washer shown in FIG. 1 nested in the turbine hub.
Figure 5A:
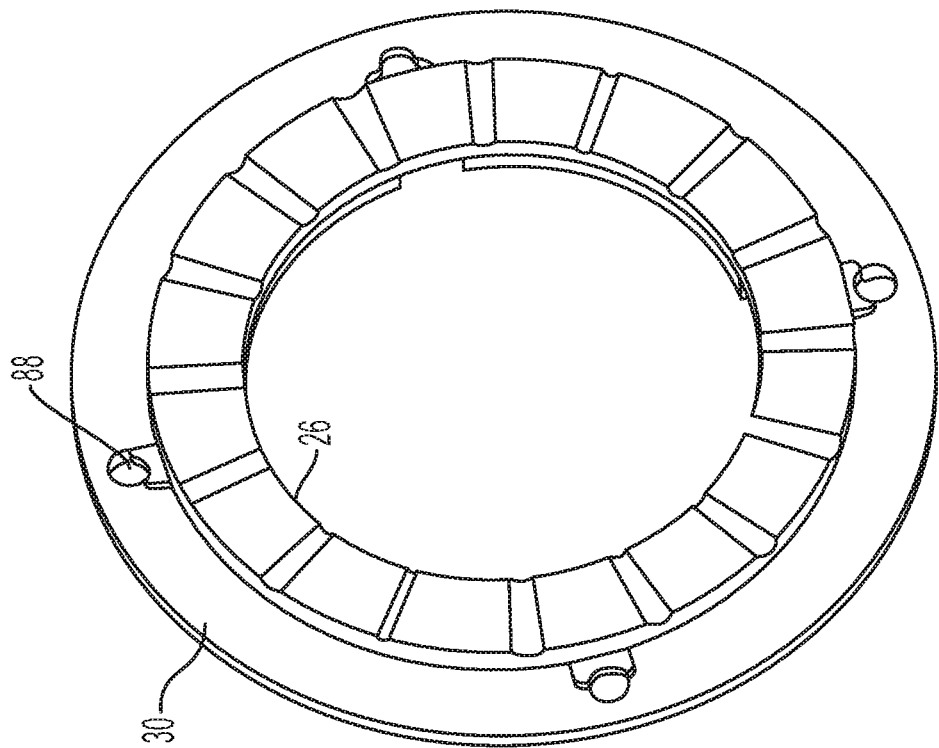
Figure 6:
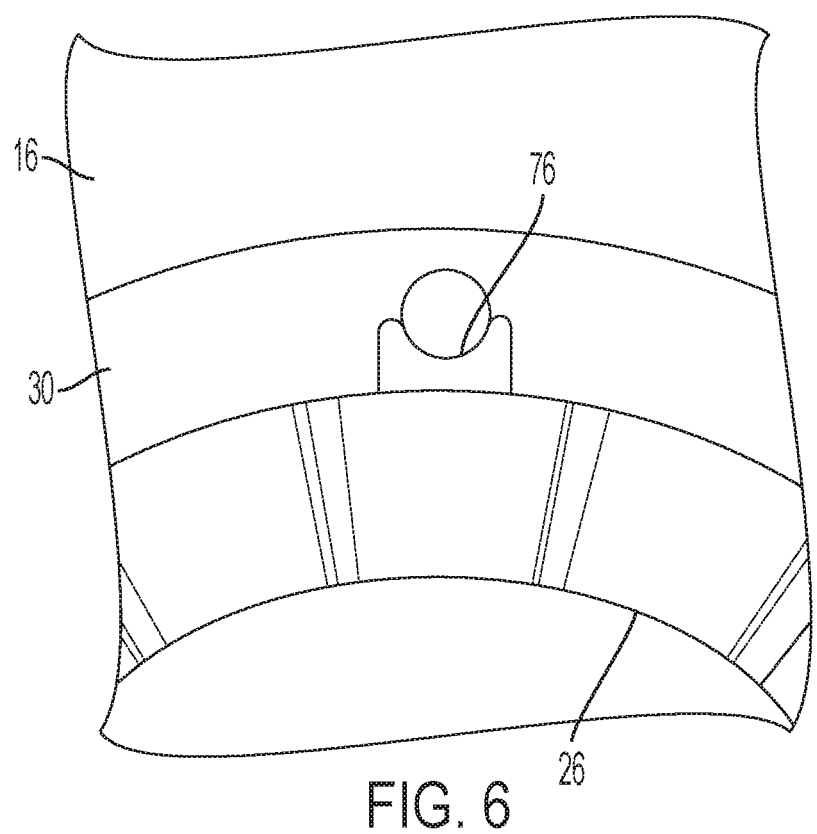
FIG. 6 is an enlarged view of the thrust washer nested in the turbine hub shown in FIG. 5A.
Figure 7:
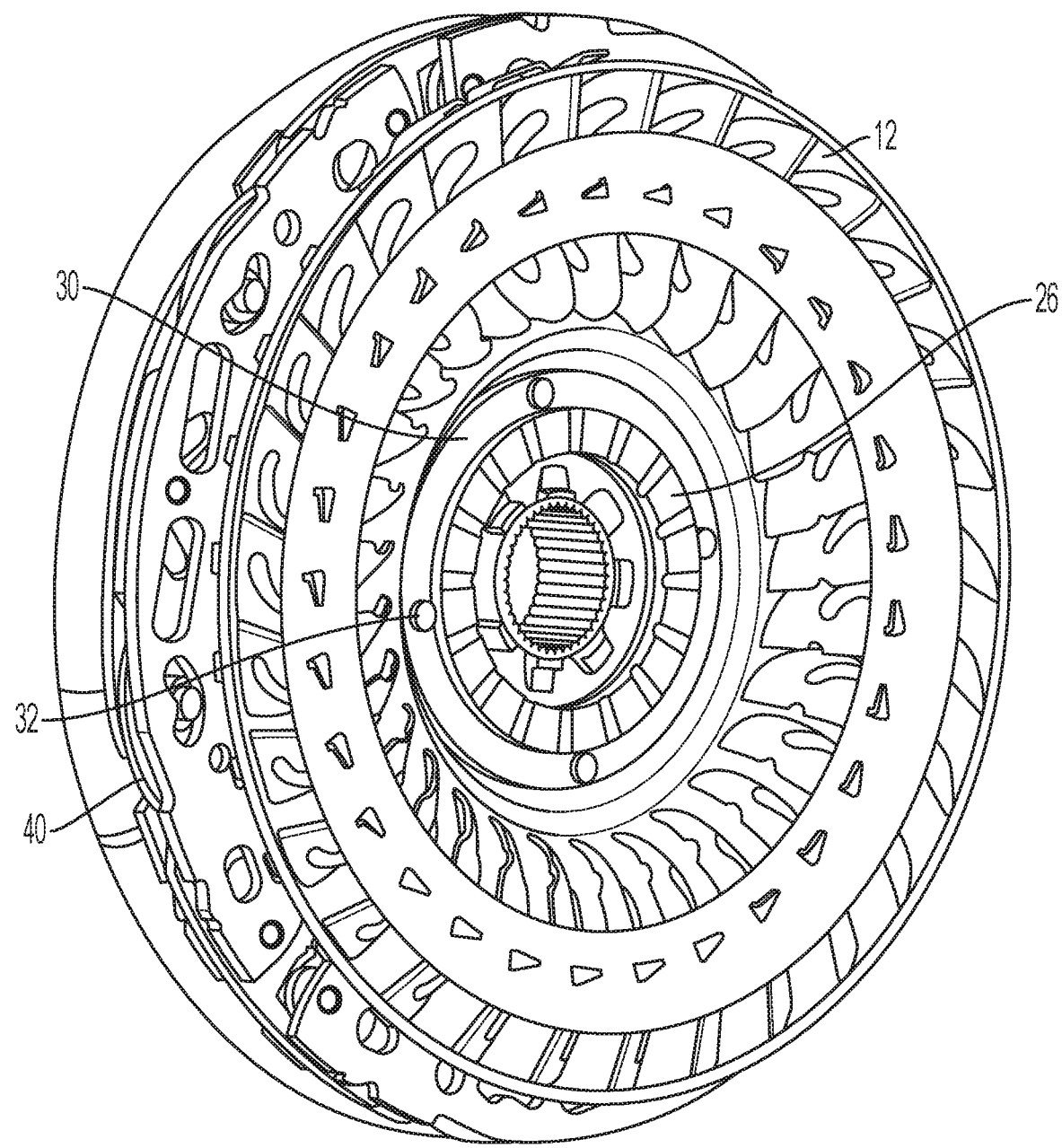
FIG. 7 shows a perspective view of the full turbine assembly of the torque converter shown in FIG. 1.

With reference to FIGS. 4-7, turbine hub 30 includes one or more pockets 80 extending radially from inner circumferential surface 82 toward outer circumferential surface 84. Each pocket 80 is configured for individual tabs 60 of thrust washer 26 to nest within when assembled together. In one embodiment, turbine hub 30 includes four pockets 80 arranged for the four tabs 60 of thrust washer 26 to nest within. However, it is to be understood that this number can be lower or higher. Each pocket 80 is shaped to mate with individual tabs 60. In one embodiment, each pocket 80 includes a thickness 86 at least equal to the thickness T1 of tab 60. Each pocket 80 includes a portion 88 that may be substantially circular in shape configured to accommodate rivet 32 and in particular, rivet body portion 78. As shown in FIGS. 5-6, groove 76 of tab 60 together with portion 88 of turbine hub pocket 80 form an opening for receiving rivet 32, and specifically, rivet body portion 78. In this way, rivet 32 passes through the opening formed by thrust washer 26 groove 76 and portion 88 of turbine hub 30 pocket 80 such that rivet head 72 rests against tab 60 and turbine hub 30. Rivet 32 then passes through a corresponding opening in turbine radially inner portion 28 of turbine shell 16 and through a corresponding opening in second cover plate 46 of damper 40.

Figure 8:
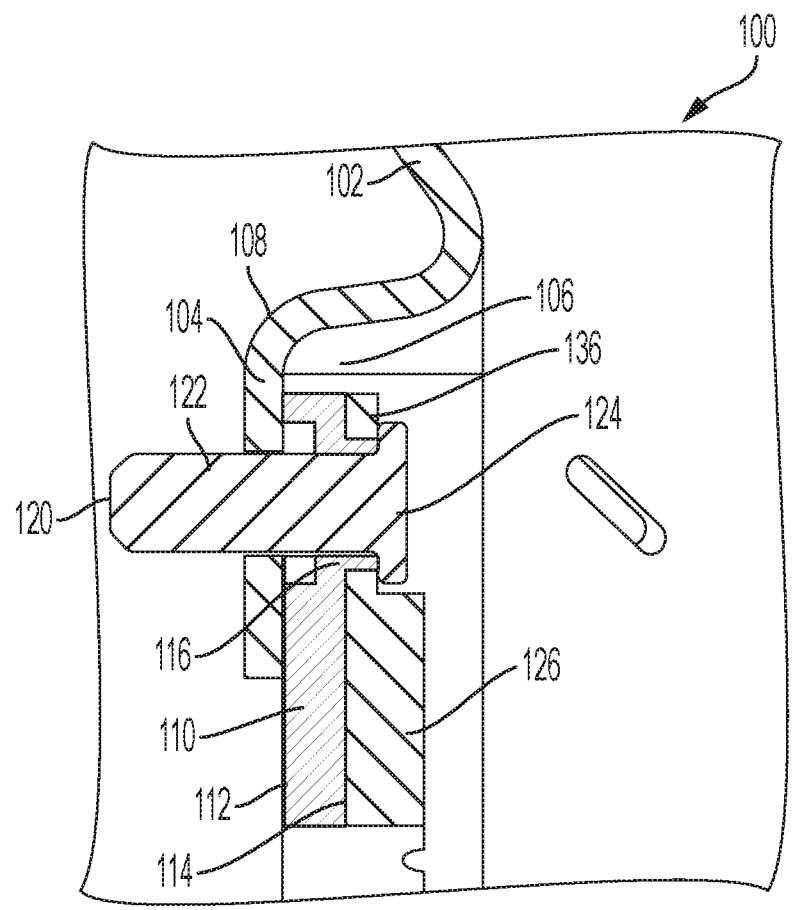
FIG. 8 shows a partial cross-sectional view of an alternative embodiment of the thrust washer and turbine assembly shown in FIG. 1 according to embodiments of the present disclosure.
Figure 9B:
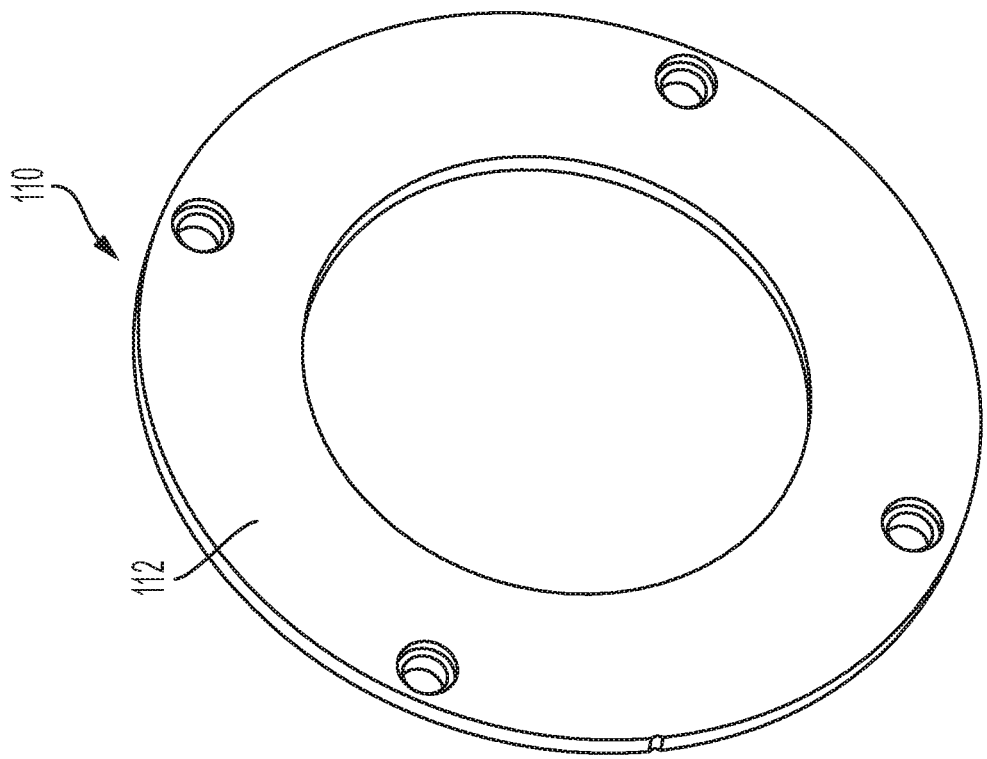
FIGS. 9A and 9B show front and back views, respectively, of the turbine hub shown in FIG. 8.
Figure 9A:
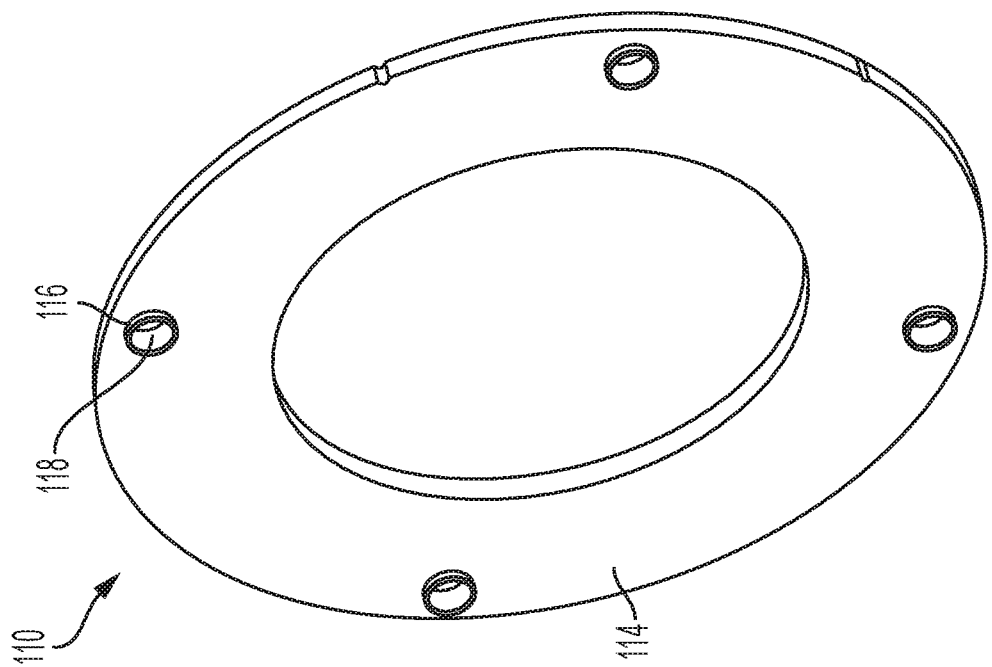
Figure 10B:
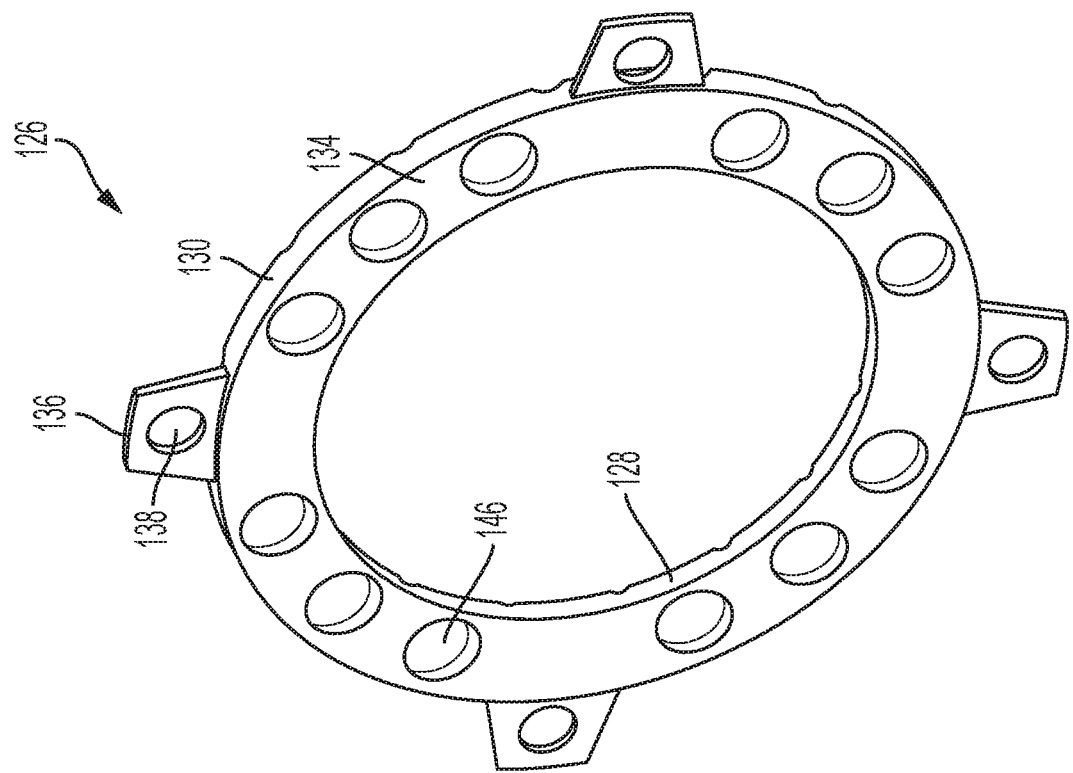
FIGS. 10A and 10B show front and back views, respectively, of the thrust washer shown in FIG. 8.
Figure 10A:
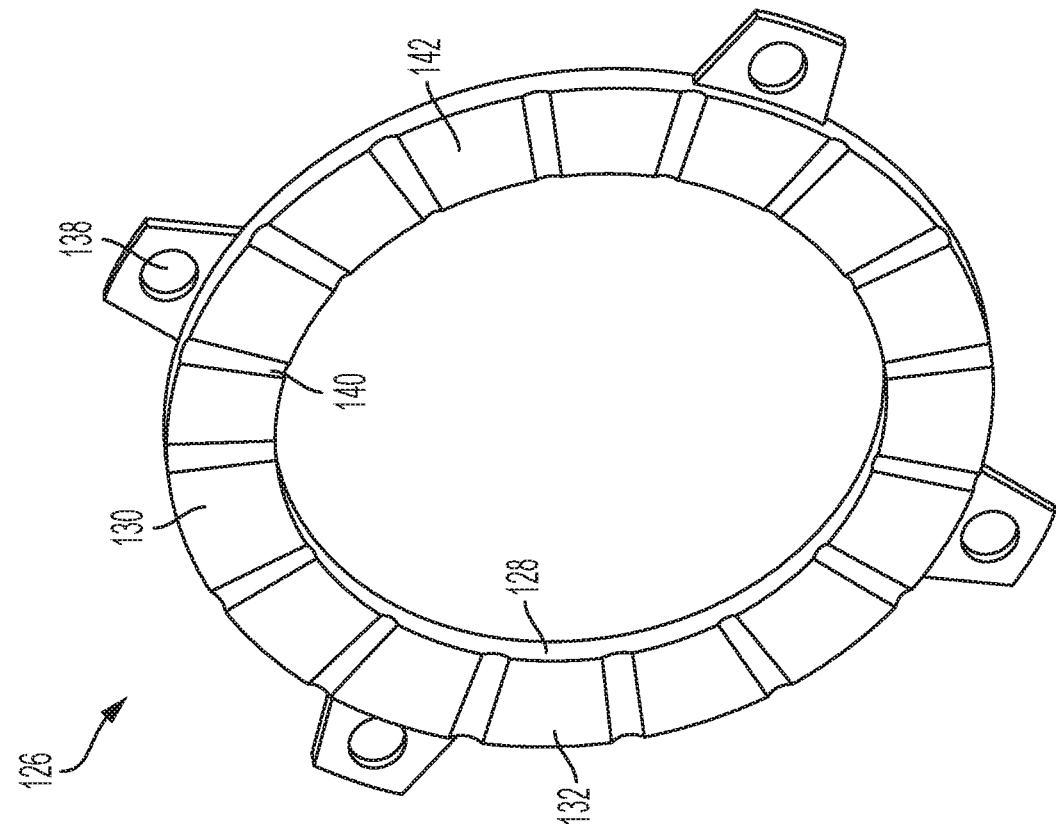

FIGS. 8-10 show an alternate embodiment of the thrust washer and turbine assembly shown in FIGS. 1-7 according to embodiments of the present disclosure. Turbine assembly 100 includes turbine shell 102 with radially inner portion 104 and having inner surface 106 and outer surface 108. Turbine shell 102 radially inner portion 104 is connected to turbine hub 110 and thrust washer 126 via rivet 120.

Turbine hub 110 includes first radial surface 112 facing turbine shell 102 and second radial surface 114, opposite first radial surface 112, facing away from turbine shell 102. First radial surface 112 of turbine hub 110 is configured to contact inner surface 106 of turbine shell radially inner portion 104 when assembled together. In this embodiment, second radial surface 114 includes one or more protrusions 116 extending outwardly therefrom. Each of the protrusions 116 includes an opening 118 defined therethrough, wherein each opening is shaped to accommodate rivet 120. That is, each protrusion 116 is configured and arranged such that rivet body portion 122 is disposed within opening 118 when assembled on turbine assembly 100. Protrusions 116 may be stamped on turbine hub 110 and are configured to center thrust washer 126 and provide a steel backing for rivet 120, and specifically, rivet head 124 that rests against an outside of protrusion 116.

Thrust washer 126 includes inner circumferential surface 128, outer circumferential surface 130, first radial surface 132, and second radial surface 134. One or more tabs 136 extending radially outward from outer circumferential surface 130. Each of the tabs 136 includes a hole or opening 138 defined therein for centering on rivet 120 and preventing axial and radial movement of thrust washer 126. When thrust washer 126 is assembled together with turbine hub 110, opening 138 of thrust washer tab 136 is configured to fit over turbine hub protrusion 116 such that thrust washer second radial surface 134 contacts turbine hub second radial surface 114. That is, turbine hub protrusion 116 is disposed within thrust washer tab opening 138 and rivet body portion 122 is disposed within turbine hub protrusion opening 118 such that rivet head 124 rests against an outside of turbine hub protrusion 116 and thrust washer tab 136. In this way, rivet 120 retains thrust washer 126 on turbine hub 110 when assembled together.

Additionally, thrust washer first radial surface 132 includes grooves 140 formed therein and extending radially from inner circumferential surface 128 to outer circumferential surface 130 and thrust pads or thrust surfaces 142 disposed circumferentially between grooves 140. Thrust washer second radial surface 134 includes one or more empty pockets 146 formed therein and provided for reducing overall mass and material cost.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 10 torque converter
12 turbine assembly
14 turbine
16 turbine shell
18 blades
20 outer surface
22 inner surface
24 rounded portion
26 thrust washer
28 turbine radially inner portion
30 turbine hub
32 rivet
34 first radial surface
36 second radial surface
40 damper
42 circumferentially spaced springs
44 second cover plates
46 second cover plate
48 output
50 centrifugal pendulum absorber
52 thrust washer first radial surface
54 thrust washer second radial surface
56 thrust washer outer circumferential surface
58 thrust washer inner circumferential surface
60 thrust washer tab
62 grooves
64 thrust pads or thrust surfaces
66 empty pockets
68 tab first radial surface
70 tab second radial surface
72 rivet head
74 distal end
76 groove
78 rivet body portion
80 pockets
82 inner circumferential surface
84 outer circumferential surface
86 thickness
88 portion
100 turbine assembly
102 turbine shell
104 turbine shell radially inner portion
106 inner surface
108 outer surface 110 turbine hub
112 first radial surface
114 second radial surface
116 protrusions
118 opening
120 rivet
122 rivet body portion
124 rivet head
126 thrust washer
128 inner circumferential surface
130 outer circumferential surface
132 thrust washer first radial surface
134 thrust washer second radial surface
136 tabs
138 opening
140 grooves
142 thrust surfaces
146 empty pockets

What is claimed is:

1. A turbine assembly for a torque converter, comprising:
a turbine including a turbine shell, the turbine shell having a rounded portion with blades attached thereto and a radially extending portion extending radially inward from the rounded portion;
a turbine hub coupled to the radially extending portion of the turbine shell via a fastener; and
a thrust washer disposed on the turbine hub and including at least one tab configured to contact the fastener, wherein the fastener axially and radially retains the thrust washer on the turbine hub.

2. The turbine assembly of claim 1, wherein:
the turbine hub includes at least one recessed portion extending radially outward from an inner circumference of the turbine hub toward an outer circumference of the turbine hub; and
the at least one tab of the thrust washer is configured to nest within the at least one recessed portion of the turbine hub.

3. The turbine assembly of claim 1, wherein the at least one tab includes a distal end with a groove formed therein and the groove is configured to accommodate a portion of the fastener.

4. The turbine assembly of claim 1, wherein:
the thrust washer includes a first radial surface and a second radial surface;
the at least one tab extends radially outward from the first radial surface beyond an outer circumference of the thrust washer; and
at least one recessed portion is formed in the second radial surface.

5. The turbine assembly of claim 4, wherein a plurality of grooves is formed in the second radial surface for fluid flow therethrough.

6. The turbine assembly of claim 4, wherein the at least one tab has a first thickness that is less than a second thickness of the thrust washer defined between the first and second radial surfaces.

7. The turbine assembly of claim 1, wherein:
the at least one tab extends from an outer circumferential surface of the thrust washer and includes an opening defined therein;
the turbine hub includes at least one protrusion with an opening defined therethrough; and
the at least one protrusion is disposed within the opening of the thrust washer.

8. The turbine assembly of claim 7, wherein a portion of the fastener is disposed within the opening in the protrusion of the turbine hub and a head portion of the fastener is supported against the turbine hub and thrust washer.

* * * * *